(12) United States Patent
Yamaguchi et al.

(10) Patent No.: US 10,530,172 B2
(45) Date of Patent: Jan. 7, 2020

(54) POWER STORAGE CONTROL APPARATUS, DIRECT-CURRENT POWER SYSTEM, AND CONTROLLING METHOD THEREOF

(71) Applicant: OMRON Corporation, Kyoto-shi, Kyoto (JP)

(72) Inventors: Yoshihiko Yamaguchi, Kyoto (JP); Makoto Ohashi, Uji (JP); Osamu Uchida, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 439 days.

(21) Appl. No.: 15/468,161

(22) Filed: Mar. 24, 2017

(65) Prior Publication Data

US 2017/0288416 A1 Oct. 5, 2017

(30) Foreign Application Priority Data

Apr. 5, 2016 (JP) ................. 2016-075749

(51) Int. Cl.
*H02J 7/00* (2006.01)
*H02J 1/04* (2006.01)
*H02J 7/35* (2006.01)
*H02M 3/04* (2006.01)

(52) U.S. Cl.
CPC ............. *H02J 7/007* (2013.01); *H02J 1/04* (2013.01); *H02J 7/0034* (2013.01); *H02J 7/0045* (2013.01); *H02J 7/35* (2013.01); *H02M 3/04* (2013.01); *Y02E 10/566* (2013.01)

(58) Field of Classification Search
CPC ......... H02J 7/007; H02J 7/0034; H02J 7/0045
USPC .......................................................... 307/46
See application file for complete search history.

(56) References Cited

U.S. PATENT DOCUMENTS

| | | | | |
|---|---|---|---|---|
| 8,338,987 | B2* | 12/2012 | O'Brien .................... | H02J 3/32 |
| | | | | 136/244 |
| 8,384,242 | B2* | 2/2013 | Ogawa ...................... | H02J 3/32 |
| | | | | 290/44 |
| 8,558,409 | B2* | 10/2013 | Zapata ..................... | H02H 7/222 |
| | | | | 290/44 |
| 9,917,445 | B2* | 3/2018 | West ........................ | H02J 3/383 |

FOREIGN PATENT DOCUMENTS

JP 2013-138530 A 7/2013

\* cited by examiner

*Primary Examiner* — Alfonso Perez Borroto
(74) *Attorney, Agent, or Firm* — Metroplex IP Law Group, PLLC

(57) ABSTRACT

A power line interface is electrically connectable to a direct-current power system including a power line. A bidirectional DC-DC converter is electrically connected to the power line interface and a battery. A controller receives a first current value measured by a first current sensor and a current command value and performs constant current control processing that controls the bidirectional DC-DC converter so that the first current value equals the current command value. The controller receives a first voltage value measured by a voltage sensor and a voltage command value and performs constant voltage control processing that controls the bidirectional DC-DC converter so that the first voltage value equals the voltage command value. The controller switches operation from the constant current control processing to the constant voltage control processing.

13 Claims, 2 Drawing Sheets

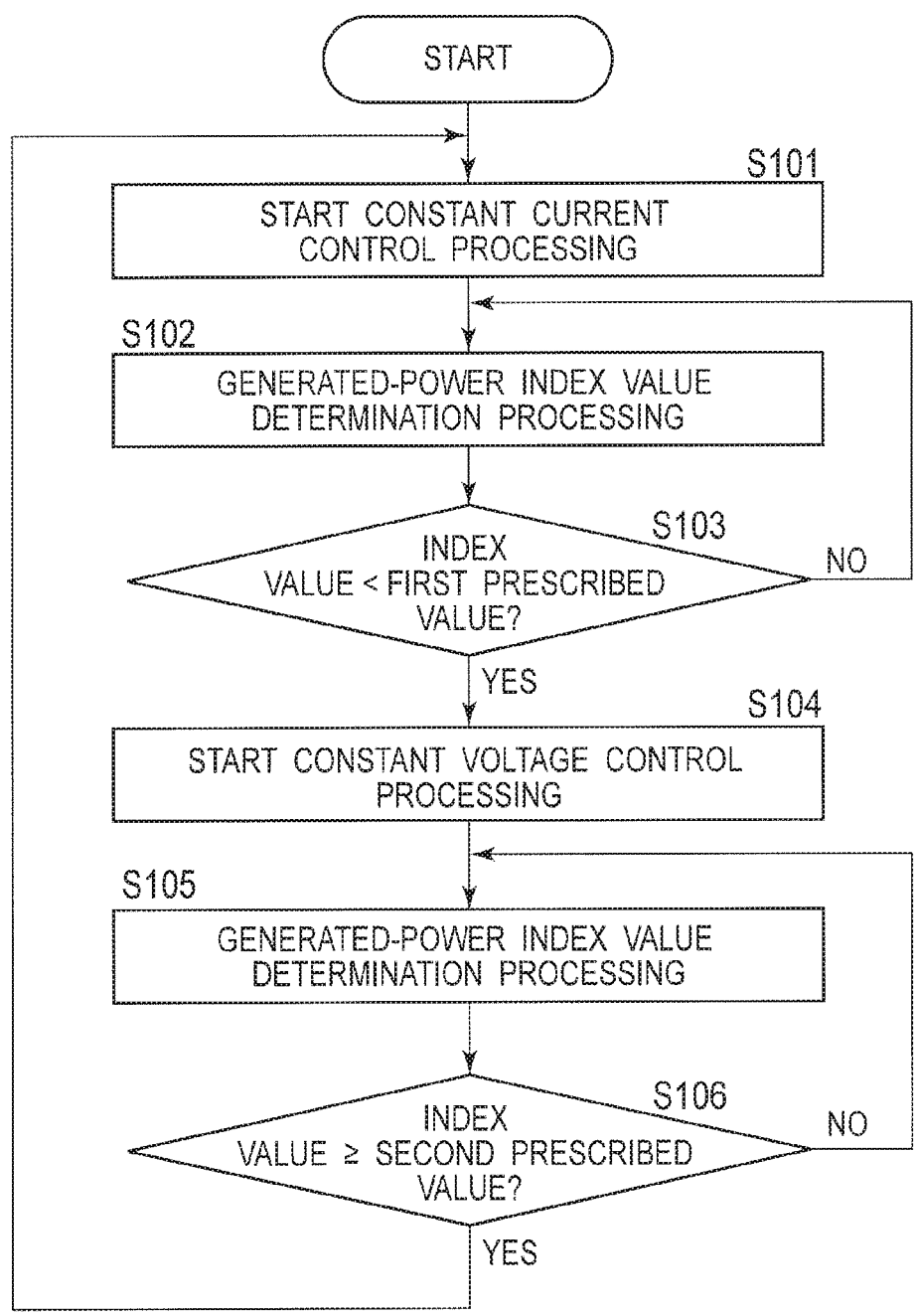

POWER STORAGE CONTROL APPARATUS, DIRECT-CURRENT POWER SYSTEM, AND CONTROLLING METHOD THEREOF

CROSS REFERENCE TO RELATED APPLICATIONS

This application claims priority based on 35 USC 119 from prior Japanese Patent Application No. 2016-075749 filed on Apr. 5, 2016, entitled "POWER STORAGE CONTROL APPARATUS", the entire contents of which are hereby incorporated herein by reference.

BACKGROUND

The disclosure relates to a power storage control apparatus.

Japanese Patent Application Publication No. 2013-138530 discloses that a battery is added to an existing solar photovoltaic system so that excess power may be stored in the battery. FIG. 1 illustrates a power storage control apparatus of a related art. Charging of a battery requires DC voltage. Thus, to add a battery to a solar photovoltaic system, battery 20 is typically connected through bidirectional DC-DC converter 40 to power line 35 connecting solar photovoltaic (PV) module 30 and PCS 32, as schematically depicted in FIG. 1.

In the system illustrated in FIG. 1, a controller (omitted from FIG. 1) for bidirectional DC-DC converter 40 (also referred to as converter 40 hereinbelow) may perform control as follows:

While PV module 30 is generating power, the controller controls converter 40 so that a certain amount of power may be inputted to the PCS 32 (or in other words, so that a certain portion of the power generated by PV module 30 may be supplied to PCS 32 and the rest may be stored in battery 20).

While PV module 30 is not generating power, the controller controls converter 40 so that an input voltage for PCS 32 may be maintained at a predetermined voltage.

In other words, the controller may perform a constant current control on converter 40 while PV module 30 is generating power, and perform a constant voltage control on converter 40 while PV module 30 is not generating power. By such control of converter 40, excess power of the power generated by PV module 30 can be stored in battery 20 (e.g., when power generated by PV module 30 is more than the power consumed by load 44), and while PV module 30 is not generating power, the power stored in battery 20 can be supplied to load 44 either solely or together with power from grid 42. Thus, the above-described control enables effective use of the power generation capacity of PV module 30.

SUMMARY

One or more embodiments of a power storage control apparatus may include: a power line interface electrically connectable to a direct-current power system including a power line; a bidirectional DC-DC converter electrically connected to the power line interface and a battery; the battery; a first current sensor that measures a first current value of direct current outputted from the bidirectional DC-DC converter; a voltage sensor that measures a first voltage value of the power line interface; and a controller that receives the first current value measured by the first current sensor and a current command value and performs constant current control processing that controls the bidirectional DC-DC converter so that the first current value equals the current command value, wherein the controller receives the first voltage value measured by the voltage sensor and a voltage command value and performs constant voltage control processing that controls the bidirectional DC-DC converter so that the first voltage value equals the voltage command value, wherein the controller switches operation from the constant current control processing to the constant voltage control processing.

One or more embodiments of a direct-current power system may include: a direct-current power generation apparatus; a load apparatus that converts or consumes power generated by the direct-current power generation apparatus; a power line connecting the direct-current power generation apparatus and the load apparatus to each other; a diode electrically connected to the power line, and that prevents current supplied by the direct-current power generation apparatus from flowing in a reverse direction of a direction in which the current flows; a power line interface electrically connected to the power line; a bidirectional DC-DC converter electrically connected to the power line interface and a battery; a first current sensor that measures a first current value of direct current outputted from the bidirectional DC-DC converter; a second current sensor that measures a second current value of direct current of the power line; a voltage sensor that measures a first voltage value of the power line interface; the battery; and a controller that receives the first current value measured by the first current sensor and a current command value and performs constant current control processing that controls the bidirectional DC-DC converter so that the first current value equals the current command value, wherein the controller receives the first voltage value measured by the voltage sensor and a voltage command value and performs constant voltage control processing that controls the bidirectional DC-DC converter so that the first voltage value equals the voltage command value, wherein the controller switches operation from the constant current control processing to the constant voltage control processing.

One or more embodiments of a controlling method of a direct-current power system including a direct-current power generation apparatus, a load apparatus that converts or consumes power generated by the direct-current power generation apparatus, a power line connecting the direct-current power generation apparatus and the load apparatus to each other, and a diode provided to the power line, and that prevents current supplied by the direct-current power generation apparatus from flowing in a reverse direction of a direction in which the current flows, may include: measuring a first current value of direct current outputted from a bidirectional DC-DC converter electrically connected to the power line interface and a battery; measuring a second current value of direct current of the power line; measuring a first voltage value of the power line; receiving a current command value; receiving a voltage command value; controlling the bidirectional DC-DC converter so that the first current value of the bidirectional DC-DC converter equals the current command value; and controlling the bidirectional DC-DC converter so that the first voltage value equals the voltage command value, if the first current value of the bidirectional DC-DC converter equals the current command value.

BRIEF DESCRIPTION OF DRAWINGS

FIG. 3 is a flowchart of battery control processing performed by a controller of the power storage control apparatus according to one or more embodiments.

DETAILED DESCRIPTION

Figure 1:
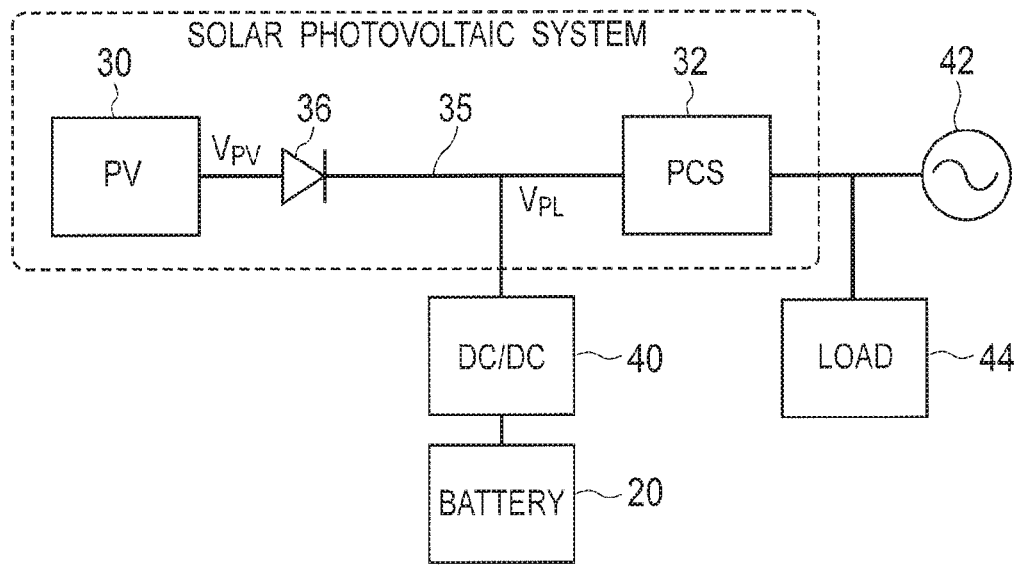
FIG. 1 illustrates the basic configuration of a system in which a battery is added to a solar photovoltaic system of the related art.

Embodiments are explained with referring to drawings. In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

Figure 2:
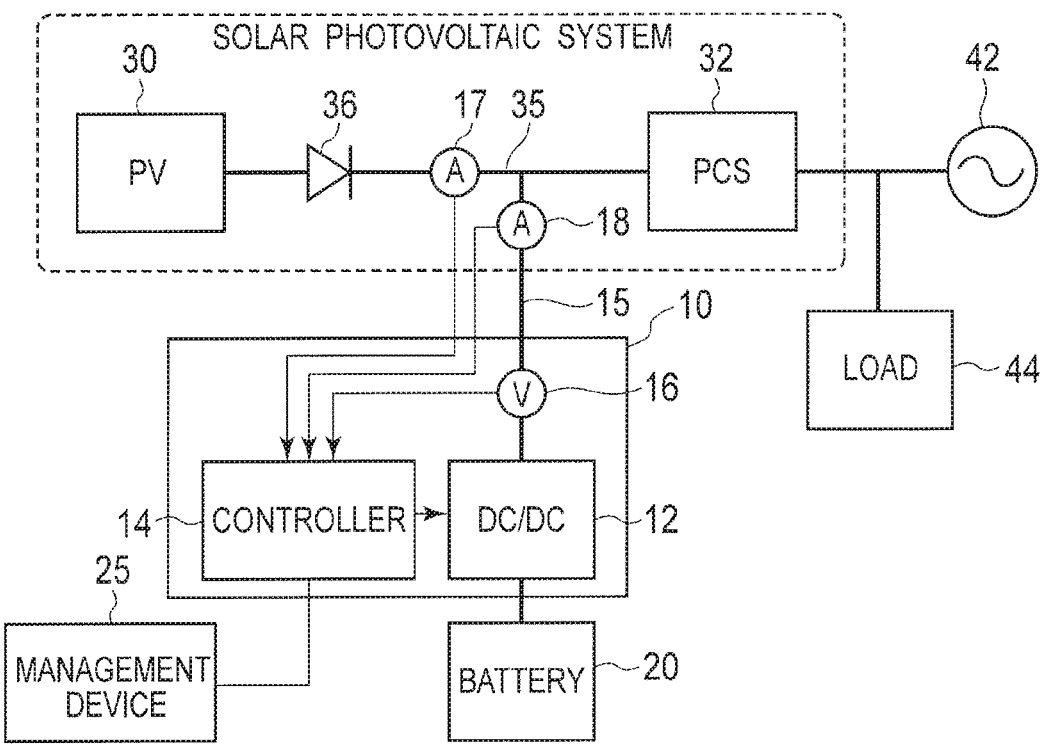
FIG. 2 illustrates a power storage control apparatus according to one or more embodiments.

FIG. 2 illustrates power storage control apparatus 10 according to one or more embodiments. Power storage control apparatus 10 may be added to a existing power generation system with a battery 20. The power generation system may include direct-current power generation apparatus 30 such as a solar photovoltaic (PV) module and power conditioner (PCS (power conditioning system)) 32 electrically connected to the direct-current power generation apparatus 30 such as a solar photovoltaic (PV). The power generation apparatus may include natural energy electric generation apparatus using renewable energy such as sunlight, solar heat, hydraulic power, wind power, biomass, and geothermal power. The direct-current power generation system such as a solar photovoltaic system with which power storage control apparatus 10 may be a typical solar photovoltaic system including solar photovoltaic (PV) module 30 and power conditioner (PCS (power conditioning system)) 32 connected to each other by power line 35, with PCS 32 connected to grid 42 and to load 44.

Power storage control apparatus 10 gives a power storage such as a battery to the solar photovoltaic system. As depicted in FIG. 2, power storage control apparatus 10 includes DC-DC converter 12 and controller 14.

DC-DC converter 12 is a bidirectional DC-DC converter connected to power line 35 and to battery 20. DC-DC converter 12 is connected to power line 35 through power line 15. Any DC-DC converter may be used as DC-DC converter 12 as long as it can charge battery 20 with power from power line 35 and supply power from battery 20 to power line 35 (or PCS 32 in particular). A converter having circuitry in which a transformer is interposed between two full-bridge circuits may be used as DC-DC converter 12.

Controller 14 is a unit that controls converter 12 so that charge or discharge power for battery 20 (power that charges battery 20 or power that is discharged by battery 20) may equal a desired value. Controller 14 is formed by a microcontroller, interface circuits for interfacing with other elements, and the like.

As illustrated in FIG. 2, controller 14 receives signals from voltage sensor 16, current sensor 17, and current sensor 18. Voltage sensor 16 measures the voltage of power line 35 (=the voltage of power line 15). Although depicted inside power storage control apparatus 10 in FIG. 2, voltage sensor 16 may be provided outside power storage control apparatus 10 as long as voltage sensor 16 can measure the voltage of power line 35. Current sensor 17 detects the magnitude of current flowing through power line 35 in a portion between the junction with power line 15 and PV module 30. Current sensor 18 detects the magnitude of current flowing through power line 15.

Management device 25 is connected to controller 14 by a communication line. Management device 25 is a kind of computer that works as a user interface for enabling input of various settings for power storage control apparatus 10 (or controller 14 in particular). When power storage control apparatus 10 is to be brought into operation, some pieces of information including a voltage command value (described in detail later) are set in power storage control apparatus 10 (controller 14) using management device 25.

The operations of power storage control apparatus 10 are described below.

Controller 14 of power storage control apparatus 10 is configured (programmed) to start battery control processing when power storage control apparatus 10 is powered on with PV module 30 generating power. The procedure of the battery control processing is illustrated in FIG. 3.

Specifically, when power storage control apparatus 10 is powered on, controller 14 starts the battery control processing by starting constant current control processing (Step S101).

In the constant current control processing, controller 14 performs feedback control (such as PID control) of DC-DC converter 12 so that an output current value of DC-DC converter 12 may equal a current command value. The current command value in this constant current control processing indicates current that should be inputted to or outputted from DC-DC converter 12, and is determined based on information such as the average power generated by PV module 30 in a time zone in which PV module 30 is generating power and the average power consumed by load 33 in this time zone. The current command value may be a preset fixed value, a value obtained by dividing a preset power command value by a voltage value detected by voltage sensor 16, or a value variable depending on the present time or the like.

After Step S101, controller 14 repeats Steps S102 and S103 while performing the constant current control processing.

In Step S102, controller 14 performs generated-power index value determination processing, in which controller 14 multiplies an output from voltage sensor 16 by an output from current sensor 17 and sets the product of this multiplication (i.e., the amount of power supplied from PV module 30) as the generated-power index value. It is only necessary that the generated-power index value determined in the generated-power index value determination processing be a value indicative of the amount of power generated by PV module 30 (or in other words, a value correlated to the amount of power generated by PV module 30). Thus, as the generated-power index value determination processing, controller 14 may set only an output from the current sensor 17 as the power-generated index value. Alternatively, as the generated-power index value determination processing, controller 14 may calculate (estimate) the magnitude of current flowing in from PV module 30 based on an output from current sensor 17 and what kind of control DC-DC converter 12 is under, and set the result of this calculation or the product of a multiplication of this calculation result by an output from current sensor 17, as the generated-power index value.

After performing the generated-power index value determination processing, in Step S103 controller 14 determines whether the power-generated index value determined by the generated-power index value determination processing (referred to simply as "INDEX VALUE" in FIG. 3) is smaller than a first prescribed value. The first prescribed value is a value preset as the lower limit of a generated-power index value range in which the constant current control processing is preferable to constant voltage control processing.

Controller 14 repeats Steps S102 and S103 until the generated-power index value falls below the first prescribed value. When the generated-power index value falls below the first prescribed value (Yes in Step S103), controller 14 stops the constant current control processing and starts constant voltage control processing (Step S104).

In the constant voltage control processing, controller 14 performs feedback control of DC-DC converter 12 so that a voltage value detected by the voltage sensor 16 may equal a voltage command value. The voltage command value is set in power storage control apparatus 10 (or controller 14 in particular) using management device 25 when power storage control apparatus 10 is to be brought into operation. When bringing power storage control apparatus 10 into operation, a user (such as the administrator or the installer) of power storage control apparatus 10 checks the voltage range that enables PCS 32 to operate (hereinafter referred to as an operable voltage range) and sets the voltage command value to a value several volts larger than the lower limit of the operable voltage range. The reason for setting the voltage command value to a value larger than the lower limit of the operable voltage range is because a voltage value of power line 35 detected by voltage sensor 16 may be different from a voltage value of power line 35 detected by a voltage sensor in PCS 32 due to the sensors' individual variabilities and measurement error.

After Step S104, while performing constant voltage control processing, controller 14 repeats the generated-power index value determination processing described above until the generated-power index value (referred to simply as "INDEX VALUE" in FIG. 3) equals or exceeds a second prescribed value (Steps S105 and S106). The second prescribed value (which corresponds to the "prescribed value" of the invention) is preset as the upper limit of a generated-power index value range in which the constant voltage control processing is preferable to constant current control processing, and is larger than the first prescribed value. The second prescribed value may be the same as the first prescribed value. However, if the second prescribed value is equal to the first prescribed value, before the constant current control processing or the constant voltage control processing is performed stably, these controls may be switched frequently. It is therefore preferable that the second prescribed value be larger than the first prescribed value.

When the generated-power index value equals or exceeds the second prescribed value (Yes in Step S106), controller 14 stops the constant voltage control processing and starts the constant current control processing (Step S101).

As described thus far, power storage control apparatus 10 according to this embodiment is configured to set a voltage command value for use in a constant voltage control. Thus, power storage control apparatus 10 can set the voltage command value to a value close to the lower limit of the operable voltage range of PCS 32 with which power storage control apparatus 10 is used. Such a voltage command value is the minimum value not to hinder the operation of PCS 32. The smaller the voltage command value, the more effectively the power that PV module 30 generates immediately after resuming power generation. Thus, power storage control apparatus 10 enables effective use of the power that PV module 30 generates immediately after resuming power generation, irrespective of the type of PCS 32 with which power storage control apparatus 10 is used.

<<Modification>>

Power storage control apparatus 10 may be modified variously. For instance, many of recent PCSs 32 are capable of outputting information from which the lower limit of its operable voltage range is determinable (which may be the model name or the very lower limit of the operable voltage range), by making a certain access through a communication line. Thus, controller 14 may be a unit that acquires information from which the lower limit of the operable voltage range is determinable, determines a voltage command value based on the information acquired, and manages the voltage command value thus determined.

Instead of Steps S102 and S103 of the battery control processing, controller 14 may perform an operation of waiting (monitoring) for the voltage value of power line 35 to equal the voltage command value or an operation for waiting for the difference between the voltage value of power line 35 and the voltage command value to equal or fall below a predetermined value. Moreover, one of these operations may be performed after S103 and before Step S104 in the battery control processing.

Management device 25 or controller 14 may have a table in which each model name is associated with a voltage command value determined based on the lower limit of the operable voltage range of PCS 32 of that model, so that an appropriate voltage command value may be set in controller 14 when a model name is inputted to management device 25. Furthermore, it goes without saying that power storage control apparatus 10 may be provided with an operation panel for use to set the voltage command value, or modified as a device connected to and used with the following power generation system which is not a solar photovoltaic system: "a power generation system comprising a direct-current power generation apparatus, a load apparatus that converts or consumes power generated by the direct-current power generation apparatus, a power line connecting the direct-current power generation apparatus and the load apparatus to each other, and a diode that is provided to the power line, and that prevents current supplied by the direct-current power generation apparatus from flowing in a reverse direction of a direction in which the current flows".

In the control illustrated in FIG. 1, when PV module 30 resumes power generation during the constant voltage control, power generated by PV module 30 cannot be used until output voltage $V_{PV}$ of PV module 30 reaches the controlled voltage of the constant voltage control (a "predetermined voltage").

To be more specific, as depicted in FIG. 1, backflow prevention diode 36 that prevents backflow of current to PV module 30 is typically provided to power line 35 connecting PV module 30 and PCS 32. Thus, even after PV module 30 resumes power generation, power from PV module 30 is not supplied to PCS 32 while output voltage $V_{VP}$ of PV module 30 is smaller than voltage $V_{PL}$ of power line 35. In the constant voltage control, voltage $V_{PL}$ is controlled to be a predetermined voltage. Thus, even after PV module 30 resumes power generation during the constant voltage control, power from PV module 30 is unusable while output voltage $V_{VP}$ of PV module 30 is smaller than the predetermined voltage.

The above problem, where power generated immediately after power generation is resumed cannot be used effectively, may occur if the system to which the power storage control apparatus is added is a power generation system comprising a direct-current power generation apparatus, a load apparatus that converts or consumes power generated by the direct-current power generation apparatus, a power line connecting the direct-current power generation apparatus and the load apparatus to each other, and a diode that is provided to the power line, and that prevents current supplied by the direct-current power generation apparatus from flowing in a reverse direction of a direction in which the current flows.

When a direct-current power generation apparatus, such as a solar PV module or a direct-current wind power generation apparatus, resumes power generation, the generated power can be used promptly if the voltage command value used for the constant voltage control is set to a small value. However, in order to operate, a load apparatus (such as a power conditioner or a power-consuming device) needs to receive an input voltage in a certain range. For this reason, the voltage command value cannot be smaller than the lower limit of this input voltage range that enables the load apparatus to operate. In addition, the input voltage range that enables a load apparatus to operate is different for each load apparatus, and therefore a fixed value cannot be used as the voltage command value. In this regard, the controller of the power storage control apparatus of the embodiments manages a preset value as the voltage command value for use in the constant voltage control. Thus, if the power storage control apparatus (the controller) of the present disclosure is set to use, as the voltage command value, a value close to the lower limit of an operable input voltage range for a load apparatus in the power generation system with which the power storage control apparatus is used, the power storage control apparatus enables effective utilization of the power that the direct-current power generation apparatus generates immediately after resuming power generation, without disturbing the operation of the load.

In the determination processing performed by the controller of the power storage control apparatus according to the embodiments, it is only necessary to determine an index value indicative of the amount of power generated by the direct-current power generation apparatus. The determination processing may be, for example, processing that includes measuring magnitude of current flowing through the power line in a portion between the direct-current power generation apparatus and a junction with the bidirectional DC-DC converter and setting a result of this measurement as the index value, or may be processing that includes measuring a voltage value of the power line and magnitude of current flowing through the power line in a portion between the direct-current power generation apparatus and a junction with the bidirectional DC-DC converter and setting a power value calculated from results of these measurements as the index value.

In the power storage control apparatus according to the embodiments, the load apparatus may be a power conditioner that converts power generated by the direct-current power generation apparatus, and the controller may acquire, from the power conditioner, information from which a lower limit of a voltage range that enables the power conditioner to operate is determinable, manages as the voltage command value a value determined based on the acquired information.

One or more embodiments of power storage control apparatus described above enables effective use of the power generated when the direct-current power generation apparatus resumes power generation.

The invention includes other embodiments in addition to the above-described embodiments without departing from the spirit of the invention. The embodiments are to be considered in all respects as illustrative, and not restrictive.

The scope of the invention is indicated by the appended claims rather than by the foregoing description. Hence, all configurations including the meaning and range within equivalent arrangements of the claims are intended to be embraced in the invention.

The invention claimed is:

1. A power storage control apparatus, comprising:
a battery;
a power line interface electrically connectable to a direct-current power system comprising a power line;
a bidirectional DC-DC converter electrically connected to the power line interface and the battery;
a first current sensor that measures a first current value of direct current outputted from the bidirectional DC-DC converter;
a voltage sensor that measures a first voltage value of the power line interface; and
a controller that receives the first current value measured by the first current sensor and a current command value and performs constant current control processing that controls the bidirectional DC-DC converter so that the first current value equals the current command value, wherein
the controller receives the first voltage value measured by the voltage sensor and a voltage command value, and performs constant voltage control processing that controls the bidirectional DC-DC converter so that the first voltage value equals the voltage command value, and
the controller switches operation from the constant current control processing to the constant voltage control processing.

2. The power storage control apparatus according to claim 1, wherein
the controller manages the voltage command value received as the voltage command value for use in the constant voltage control processing.

3. The power storage control apparatus according to claim 1, wherein
the controller receives an index value indicating an amount of power generated by a direct-current power generation apparatus and starts the constant current control processing in response to the index value reaching or exceeding a prescribed value during the constant voltage control processing.

4. A direct-current power system, comprising:
a battery;
a direct-current power generation apparatus;
a load apparatus that converts or consumes power generated by the direct-current power generation apparatus;
a power line connecting the direct-current power generation apparatus and the load apparatus to each other;
a diode electrically connected to the power line, and that prevents current supplied by the direct-current power generation apparatus from flowing in a reverse direction of a direction in which the current flows;
a power line interface electrically connected to the power line;
a bidirectional DC-DC converter electrically connected to the power line interface and the battery;
a first current sensor that measures a first current value of direct current outputted from the bidirectional DC-DC converter;
a second current sensor that measures a second current value of direct current of the power line;
a voltage sensor that measures a first voltage value of the power line interface; and a controller that receives the first current value measured by the first current sensor and a current command value and performs constant current control processing that controls the bidirectional DC-DC converter so that the first current value equals the current command value, and the controller receives a first voltage value measured by the voltage sensor and a voltage command value and performs constant voltage control processing that controls the bidirectional DC-DC converter so that the first voltage value equals the voltage command value, and the controller switches operation from the constant current control processing to the constant voltage control processing.

5. The direct-current power system according to claim 4, wherein
the controller receives an index value indicating an amount of power generated by the direct-current power generation apparatus and starts the constant current control processing in response to the index value reaching or exceeding a prescribed value during the constant voltage control processing.

6. The direct-current power system of claim 5, wherein
the controller calculates a power value based on the second current value and the first voltage value and sets the power value as the index value.

7. The direct-current power system according to claim 5, wherein
the load apparatus comprises a power conditioner that converts power generated by the direct-current power generation apparatus.

8. The direct-current power system according to claim 7, wherein the controller acquires, from the power conditioner, information from which a lower limit of a voltage range that enables the power conditioner to operate is determinable, and manages as the voltage command value a value determined based on the acquired information.

9. A method of controlling a direct-current power system comprising a direct-current power generation apparatus, a load apparatus that converts or consumes power generated by the direct-current power generation apparatus, a power line connecting the direct-current power generation apparatus and the load apparatus to each other, and a diode provided to the power line, and that prevents current supplied by the direct-current power generation apparatus from flowing in a reverse direction of a direction in which the current flows, the method comprising:

measuring a first current value of direct current outputted from a bidirectional DC-DC converter electrically connected to a power line interface and a battery;

measuring a second current value of direct current of the power line;

measuring a first voltage value of the power line;

receiving a current command value;

receiving a voltage command value;

controlling the bidirectional DC-DC converter so that the first current value of the bidirectional DC-DC converter equals the current command value; and controlling the bidirectional DC-DC converter so that a first voltage value equals the voltage command value, if the first current value of the bidirectional DC-DC converter equals the current command value.

10. The method of controlling the direct-current power system according to claim 9, further comprising:
receiving an index value indicating an amount of power generated by the direct-current power generation apparatus; and
starting constant current control processing in response to the index value reaching or exceeding a prescribed value during constant voltage control processing.

11. The method of controlling the direct-current power system according to claim 10, further comprising:
calculating a power value based on the second current value and the first voltage value; and
setting the power value as the index value.

12. The method of controlling the direct-current power system according to claim 9, wherein
the load apparatus comprises a power conditioner that converts power generated by the direct-current power generation apparatus.

13. The method of controlling the direct-current power system according to claim 9, further comprising:
acquiring, from a power conditioner, information from which a lower limit of a voltage range that enables the power conditioner to operate is determinable; and
managing as the voltage command value a value determined based on the acquired information.

* * * * *